(12) United States Patent
Kim et al.

(10) Patent No.: US 9,857,462 B2
(45) Date of Patent: Jan. 2, 2018

(54) DETECTION OF CONCEALED OBJECT ON A BODY USING RADIO FREQUENCY SIGNATURES ON FREQUENCIES AND POLARIZATIONS

(71) Applicant: Raytheon Company, Waltham, MA (US)

(72) Inventors: Jacob Kim, Dallas, TX (US); John L. Tomich, Coppell, TX (US); Raymond Samaniego, Prosper, TX (US); Howard C. Choe, Southlake, TX (US); Leslie A. Priebe, Plano, TX (US)

(73) Assignee: RAYTHEON COMPANY, Waltham, MA (US)

( * ) Notice: Subject to any disclaimer, the term of this patent is extended or adjusted under 35 U.S.C. 154(b) by 225 days.

(21) Appl. No.: 14/435,158

(22) PCT Filed: Oct. 9, 2013

(86) PCT No.: PCT/US2013/064179
§ 371 (c)(1),
(2) Date: Apr. 10, 2015

(87) PCT Pub. No.: WO2014/120289
PCT Pub. Date: Aug. 7, 2014

(65) Prior Publication Data
US 2015/0276920 A1    Oct. 1, 2015

Related U.S. Application Data

(60) Provisional application No. 61/712,232, filed on Oct. 10, 2012.

(51) Int. Cl.
G01S 13/56    (2006.01)
G01S 13/88    (2006.01)
(Continued)

(52) U.S. Cl.
CPC ............ *G01S 13/887* (2013.01); *G01S 7/025* (2013.01); *G01S 7/354* (2013.01); *G01S 7/411* (2013.01); *G01S 7/412* (2013.01)

(58) Field of Classification Search
CPC ............................... G01S 13/887; G01S 7/024
(Continued)

(56) References Cited

U.S. PATENT DOCUMENTS 4,839,654 A    6/1989 Ito et al.
5,159,343 A    10/1992 Harmuth
(Continued)

FOREIGN PATENT DOCUMENTS

WO    WO 00/75892 A2    12/2000

OTHER PUBLICATIONS

Written Opinion for International Application No. PCT/US2013/064179, dated Jul. 23, 2014 (5 pgs.).
(Continued)

*Primary Examiner* — Marcus E Windrich
(74) *Attorney, Agent, or Firm* — Lewis Roca Rothgerber Christie LLP

(57) ABSTRACT

A method for detecting a concealed object in a target. The target may include a body and the concealed object. The method may include emitting radio frequency (RF) energy toward a direction of the target, receiving a scattered RF energy reflected from the target, generating a signal corresponding to the received scattered RF energy, comparing the signal with a plurality of stored RF scattering signatures, and detecting the concealed object when the signal matches one of a plurality of RF scattering signatures. Each of the RF scattering signatures may be associated with an object of interest.

17 Claims, 5 Drawing Sheets

(51) Int. Cl.
    *G01S 7/02* (2006.01)
    *G01S 7/41* (2006.01)
    *G01S 7/35* (2006.01)

(58) Field of Classification Search
    USPC .................................................. 342/22, 27
    See application file for complete search history.

(56) References Cited

U.S. PATENT DOCUMENTS

| | | | |
|---|---|---|---|
| 5,339,080 A | 8/1994 | Steinway et al. | |
| 5,828,331 A | 10/1998 | Harper | |
| 6,121,920 A | 9/2000 | Barrett | |
| 6,243,036 B1 | 6/2001 | Chadwick et al. | |
| 6,856,271 B1 | 2/2005 | Hausner | |
| 6,967,612 B1 * | 11/2005 | Gorman | G01S 7/024 342/175 |
| 7,492,303 B1 * | 2/2009 | Levitan | G01S 7/024 342/188 |
| 7,515,089 B2 | 4/2009 | Szajnowski | |
| 8,730,098 B1 | 5/2014 | Fox | |
| 8,884,807 B1 | 11/2014 | Johansson et al. | |
| 2002/0175849 A1 | 11/2002 | Arndt et al. | |
| 2004/0183712 A1 | 9/2004 | Levitan et al. | |
| 2005/0099330 A1 | 5/2005 | Hausner et al. | |
| 2005/0231421 A1 | 10/2005 | Fleisher et al. | |
| 2006/0164287 A1 | 7/2006 | Holt et al. | |
| 2006/0238401 A1 | 10/2006 | Wuersch et al. | |
| 2008/0129581 A1 | 6/2008 | Douglass et al. | |
| 2008/0211711 A1 * | 9/2008 | Mostov | G01V 8/005 342/179 |
| 2008/0284636 A1 | 11/2008 | Hausner et al. | |
| 2009/0058710 A1 | 3/2009 | Levitan et al. | |
| 2009/0284405 A1 | 11/2009 | Salmon et al. | |
| 2010/0214154 A1 | 8/2010 | Birdsong, Jr. et al. | |
| 2011/0006940 A1 | 1/2011 | Andersson | |
| 2011/0115667 A1 | 5/2011 | Feigin et al. | |
| 2011/0227777 A1 | 9/2011 | Lee et al. | |
| 2012/0162002 A1 | 6/2012 | Semenov | |
| 2012/0229322 A1 * | 9/2012 | Mostov | G01S 7/024 342/22 |
| 2012/0293355 A1 | 11/2012 | Marianer et al. | |
| 2013/0135136 A1 | 5/2013 | Haynes et al. | |
| 2013/0169466 A1 | 7/2013 | Frederick | |
| 2014/0240161 A1 * | 8/2014 | Davidson | G01S 17/88 342/14 |
| 2016/0223666 A1 | 8/2016 | Kim et al. | |

OTHER PUBLICATIONS

International Search Report for International Application No. PCT/US2013/064179, dated Jul. 23, 2014 (4 pgs.).

EPO Communication dated Mar. 10, 2017 in corresponding European Application No. 13849971.0, European Application published Aug. 15, 2015 as publication No. 2906965 (5 pgs.).

* cited by examiner

DETECTION OF CONCEALED OBJECT ON A BODY USING RADIO FREQUENCY SIGNATURES ON FREQUENCIES AND POLARIZATIONS

CROSS-REFERENCE TO RELATED APPLICATIONS

This application is a National Phase Patent Application and claims priority to and benefit of International Application Number PCT/US2013/064179, filed on Oct. 9, 2013, which claims priority to and benefit of U.S. Provisional Application No. 61/712,232, filed on Oct. 10, 2012, the entire disclosures of which are incorporated herein by reference.

This application is also related to U.S. patent application Ser. No. 14/051,037, filed Oct. 10, 2013 entitled Radar Detection of a Concealed Object on a Body, Published Aug. 4, 2016 under Publication No. 2016/0223666 A1, the entire content of which is incorporated herein by reference.

FIELD

Embodiments of the present invention relate to the field of object detection, and more specifically to the detection of concealed objects on a target.

BACKGROUND

In recent years, there has been a growing threat of concealed objects such as weapons and suicide vests housing improvised explosive devices (IEDs) on, for example, a person's body or a vehicle. Current standoff radio frequency (RF) detection systems consist of millimeter wave or terahertz imaging systems looking for image anomalies indicative of concealed objects. However, high-resolution imaging processes are often computationally expensive and time consuming. Further, it may be difficult to find image anomalies due to various factors such as movement of the body or the concealed object, aliases, and other imaging resolution issues. These issues may lead to a low probability of detection and/or a high probability of false alarms. Furthermore, the millimeter wave or the terahertz radar systems require high power transmission due to high RF propagation loss (e.g., greater than 90 dB) at tactical ranges (e.g., 20 m-100 m). However, high power RF transmission can cause a serious radiation hazard problem to persons in proximity to the target area.

Accordingly, what is desired is a low-cost, low-power solution that does not expose persons in a target area to high levels of RF radiation, and which has a high probability of detection of the concealed object and low probability of false alarms.

Further, it is desired to develop a radar solution for real-time detection of concealed objects on a target's body at a tactical stand-off range of, for example, 20 m-100 m (which would permit an operator sufficient time/space to safely nullify a detected threat).

SUMMARY

According to embodiments of the present invention, the presence of concealed objects is detected by observing the RF scattering response of a target, checking the observed signal against a library of stored RF scattering signatures to find a match.

According to some embodiments of the present invention, there is provided a method for detecting a concealed object in a target including a body and the concealed object, the method including: emitting, by an emitter, radio frequency (RF) energy toward a direction of the target; receiving, by a receiver, a scattered RF energy reflected from the target; generating, by the receiver, a signal corresponding to the received scattered RF energy; comparing, by a processor, the signal with a plurality of stored RF scattering signatures, each of the RF scattering signatures being associated with an object of interest; and detecting, by the processor, the concealed object when the signal matches one of plurality of stored RF scattering signatures.

The method may further include retrieving the plurality of stored RF scattering signatures from a stored data record.

The method may further include identifying the concealed object based on the matching one of the plurality of RF scattering signatures.

The emitting RF energy may further include emitting RF energy of one or more of a horizontal polarization and a vertical polarization, and the received scattered RF energy reflected from the target may have a horizontal polarization or a vertical polarization.

Each of the plurality of stored RF scattering signatures may be further associated with a transmit-receive polarization combination and a frequency band.

The transmit-receive polarization combination may include: a horizontal polarization for the emitted RF energy, and a horizontal polarization for the received scattered RF energy; a horizontal polarization for the emitted RF energy, and a vertical polarization for the received scattered RF energy; a vertical polarization for the emitted RF energy, and a horizontal polarization for the received scattered RF energy; or a vertical polarization for the emitted RF energy, and a vertical polarization for the received scattered RF energy.

The frequency band may be a frequency range in which a RF scattering response of an associated object of interest is distinguishable from RF scattering responses of other objects of non-interest including clutter and the body.

One or more of the stored RF scattering signatures represent one or more simulation results, or data collected from one or more real-world experiments.

The body may be a biological life form and the concealed object may be a concealed weapon.

The signal may match one of plurality of the RF scattering signatures when a standard deviation of a difference between the signal and the one of the plurality of RF scattering signatures is below a threshold.

The signal may match one of plurality of the RF scattering signatures when a mean of a difference between the signal and the one of the plurality of RF scattering signatures is below a threshold.

According to other embodiments of the present invention, there is provided a method for detecting one or more concealed objects in a target including a body and the one or more concealed object, the method including: emitting, by an emitter, radio frequency (RF) energy toward a direction of the target; receiving, by a receiver, a scattered RF energy reflected from the target; generating, by the receiver, one or more signals corresponding to the received scattered RF energy; comparing, by a processor, each of the one or more signals with a plurality of stored RF scattering signatures, each of the RF scattering signatures being associated with an object of interest; and detecting, by the processor, the one or more concealed objects when the one or more signals match one or more of the plurality of RF scattering signatures.

According to other embodiments of the present invention, there is provided a radar detector configured to detect a concealed object in a target including a body and the concealed object, the radar detector including: an emitter configured to emit RF energy toward a direction of the target; a receiver configured to receive a scattered RF energy reflected from the target, and to generate a signal corresponding to the scattered RF energy reflected from the target; and a processor configured: to retrieve a plurality of stored RF scattering signatures from a stored data record; to compare the signal with the plurality of stored RF scattering signatures, each of the RF scattering signatures being associated with an object of interest; and to detect the concealed object when the signal matches one of plurality of RF scattering signatures.

The emitter may emit RF energy of one or more of a horizontal polarization and vertical polarization.

The received scattered RF energy reflected from the target may have a horizontal polarization or a vertical polarization.

Each of the plurality of stored RF scattering signatures may be further associated with a transmit-receive polarization combination and a frequency band.

The transmit-receive polarization combination includes: a horizontal polarization for the emitted RF energy, and a horizontal polarization for the received scattered RF energy; a horizontal polarization for the emitted RF energy, and a vertical polarization for the received scattered RF energy; a vertical polarization for the emitted RF energy, and a horizontal polarization for the received scattered RF energy; or a vertical polarization for the emitted RF energy, and a vertical polarization for the received scattered RF energy.

The frequency band may be a frequency range in which a RF scattering response of an associated object of interest is distinguishable from RF scattering responses of other objects of non-interest including clutter and the body.

The body may be a biological life form and the concealed object may be a concealed weapon.

The signal may match one of plurality of the RF scattering signatures when a standard deviation of a difference between the signal and the one of the plurality of RF scattering signatures is below a threshold.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

Figure 1:
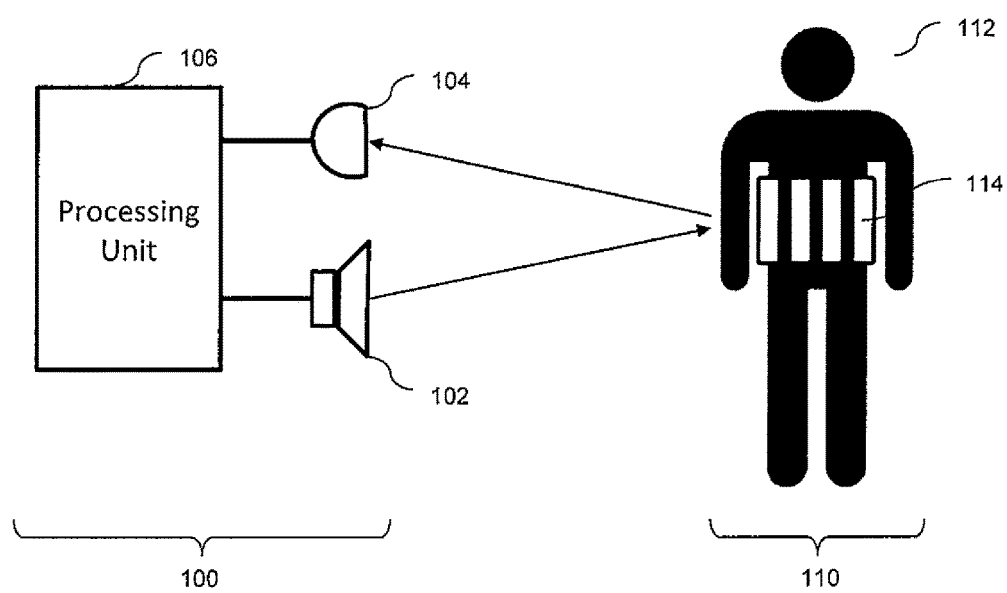
FIG. 1 is a schematic diagram illustrating a concealed object radar detection (CORD) system that utilizes RF scattering values for various frequency bands and polarizations to identify an object of interest on a target body, according to some embodiments of the present invention.

In the following detailed description, only certain example embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

In certain locations, such as airports and security check points, it may be desired to identify a body, such as a person or vehicle, which is carrying a concealed object of interest, for example, a weapon or a suicide bomber vest (SBV). A concealed object may be any kind of matter with uniform properties, or may be a complex system having a number of components and including different materials. For example, a SBV may include trigger circuitry, connecting wires, blocks of improvised explosive devices (IEDs), and shrapnel (e.g., nails). Each constituent part may have its own unique frequency-domain RF scattering response (or RF scattering signature or RF scattering fingerprint) over a frequency range and at a particular polarization. In some embodiments, the RF scattering signatures may include, not only the resonant characteristics of the object of interest, but also other dominant scattering contributors such as reflections (or multiple reflections), diffractions, reflection-diffractions and/or the like. (An RF scattering signature exhibits resonance at a frequency at which the amplitude of the RF scattering signature reaches a relative (or local) maximum.)

Embodiments of the present invention are directed to an apparatus and method for determining the presence of a concealed object (e.g., an IED) on a target by identifying the unique RF scattering signature of the concealed object from a reflected signal. According to some embodiments of the present invention, the concealed-object radar detection (CORD) system can detect concealed objects on a target body at tactically significant ranges (e.g., 20 m-100 m). In some embodiments, the detection system can also be low-cost and wide-band (e.g., having a 3:1 fractional bandwidth), since algorithms for detection and discrimination are computationally simple and 3:1 bandwidth radar antenna systems are readily available.

Because some embodiments of the present invention operate at frequency ranges that have low RF propagation loss at tactical ranges, high power transmission may not be necessary. (For example, the free space RF propagation loss at UHF bands is only a fraction of that at millimeter or terahertz bands (e.g., less than −20 dB)). As such, the CORD system, according to some embodiments, may pose no radiation risk to people in or near a target area. Further, by tuning the discrimination algorithm for a concealed object of interest through the selection of appropriate frequency bands and polarization(s), the CORD system may exhibit high probability of detection ($P_{detection}$) of the object of interest and low probability of false alarms ($P_{false\ alarm}$).

FIG. 1 is a schematic diagram illustrating a CORD system that utilizes RF scattering values for various frequency bands and polarizations to identify an object of interest on a target body, according to some embodiments of the present invention.

According to some embodiments of the present invention, the CORD system 100 includes an emitter 102 (e.g., an RF horn antenna), a receiver 104 (e.g., a tuned RF receiver), and a processing unit 106. In some examples, the emitter 102 emits RF energy in the direction of a target area. In other examples, the emitter 102 may scan a wide span area. The transmitted RF energy may have a horizontal polarization and/or a vertical polarization. The transmitted energy may have a wide frequency range (e.g., 0.2 GHz 40 GHz) or it may have frequencies occupying one or more narrow bands (e.g., the x-band from 7 GHz to 12 GHz or the $k_a$-band from 26 GHz to 40 GHz).

The receiver 104 receives the RF energy that is scattered off of the object(s) and/or person(s) in the target area and sends a corresponding signal (henceforth, "captured signal") to the processing unit 106. The target area may encompass a target 110, which, for example, may be a person 112 wearing a concealed object of interest 114 such as weapon or SBV. The receiver 104 may be tuned to capture the horizontal and/or vertical polarization of the scattered RF energy. The receiver 104 may be a wide-band receiver capturing energy in a wide range of frequencies, such as 0.2 GHz-40 GHz, or may be tuned to selectively capture energy of one or more narrow frequency bands, for example, the x-band having frequencies between 7 GHz and 12 GHz, and/or the $k_a$-band having frequencies between 26 GHz and 40 GHz.

The processing unit 106 compares the values of the frequency-domain signal levels (henceforth, "signal value") and/or other characteristics of the captured signal with the signal values and/or other characteristics of each of a plurality of stored RF scattering signatures at the frequency range and the polarity combination associated with the reflected signal. In some embodiments, the characteristics include one or more of the shape, slopes, and/or variations of the frequency domain curve, relative magnitudes of RF scattering signatures associated with same object and corresponding to different polarizations at which RF energy is emitted and received (e.g., differences in polarization responses), the signal deterioration rate of any resonance (e.g., the slope of the tail of the resonance), and/or the like. If the reflected signal matches any of the plurality of the stored RF scattering signatures (e.g., if the signal levels or characteristics of the compared signal and RF scattering signatures match), the processing unit 106 determines that a concealed object of interest is present.

In some embodiments of the present invention, the processing unit 106 retrieves the plurality of stored RF scattering signatures from a stored data record (such as a database or a look-up table), which may reside in the processing unit 106 or be external to it. The stored data record may include RF scattering signatures for objects of interest (such as a metal cylinder containing explosive material) for a variety of frequency ranges and transmit-receive polarity combinations. For example, for every object of interest and for each frequency range, the stored data record may include RF scattering signatures for one or more of the following scenarios: 1) both of the emitted RF energy and the captured RF energy have horizontal polarizations (henceforth, "H-H"); 2) the emitted RF energy has a horizontal polarization, and the captured RF energy has a vertical polarization (henceforth, "H-V"); 3) the emitted RF energy has a vertical polarization, and the captured RF energy has a horizontal polarization (henceforth, "V-H"); and 4) both of the emitted RF energy and the captured RF energy have vertical polarizations (henceforth, "V-V").

According to some embodiments, the RF scattering signatures of the plurality of stored RF scattering signatures may be attained based on real-world experimental data and/or simulation results (using, e.g., electromagnetic simulation tools), which measure/simulate the RF scattering response of each object of interest in isolation of other objects.

In some embodiments, the frequency range of the emitted RF energy and/or the received scattered RF energy, and the polarizations at which RF energy is emitted and received, may be selected to maximize (or increase) the distinguishability of the RF scattering response of the concealed object of interest against the clutter scattering of the background and other objects of non-interest.

Figure 2:
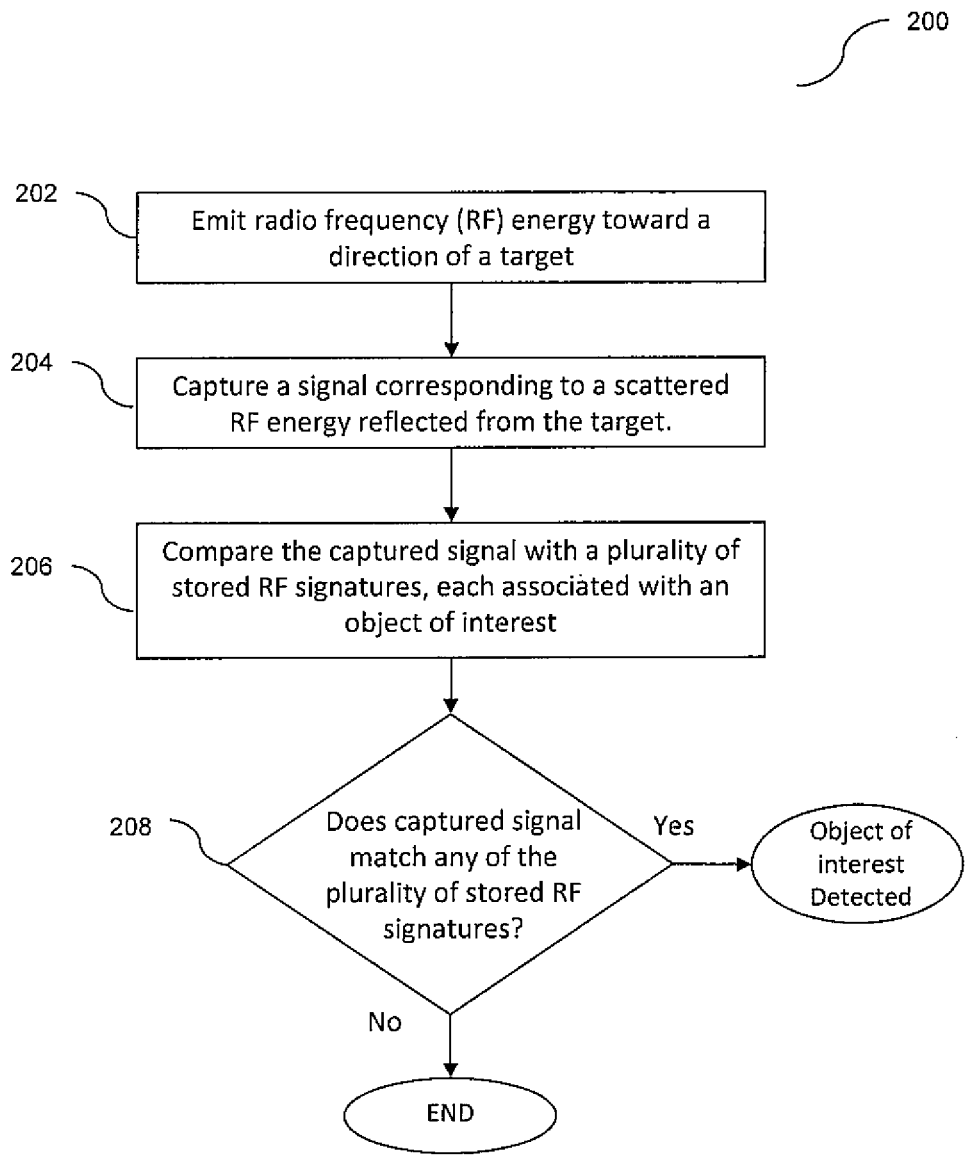
FIG. 2 is a flow diagram illustrating the process for detecting a concealed object on a target based on discrimination of the RF scattering response of the concealed object and the target body, according to some embodiments of the present invention.

FIG. 2 is a flow diagram illustrating a process 200 for detecting a concealed object on a target based on discrimination of the RF scattering signature of the concealed object and the target body, according to some embodiments of the present invention.

In block 202, the emitter 102 of the CORD system 100 emits a radio wave of one or more frequency ranges toward a direction of a target area encompassing one or more objects and/or persons, which may or may not include a concealed object of interest. According to some embodiments, the transmitted radio wave may have a horizontal and/or vertical polarization.

In block 204, the receiver 104 receives reflected radio waves that are scattered off of one or more objects and/or persons in the target area. The receiver 104 may be designed to receive radio waves of one or more frequency ranges (e.g., radio waves having a wide range of frequencies or only those that have frequencies in two narrow bands). Further, in some embodiments, the receiver 104 may filter radio waves of a horizontal or vertical polarization. The receiver 104 then generates a signal corresponding to the received scattered radio waves and transmits the signal to the processing unit 106 for further analysis.

In block 206, the processing unit 106 employs a discrimination algorithm to compare the signal values of the captured signal with signal values of each of a plurality of stored RF scattering signatures at the frequency range and polarization corresponding to the reflected signal, and to identify any potential matches. The frequency range and the polarization corresponding to the captured signal may represent parameters that maximize (or increase) the ability of the processing unit 106 to discriminate the RF scattering signature of the concealed object of interest from the clutter scattering of the background and other objects of non-interest (e.g., a human body).

The discrimination algorithm may adopt a variety of methods for determining whether or not a match exists between a captured signal and a recorded RF scattering signature. For example, in some embodiment, the processing unit 106 may calculate the mean (or average) or the standard deviation of the difference between the signal values of the reflected signal and a stored RF scattering signature, and if the mean or standard deviation is below a threshold, the processing unit 106 determines that a match exists. According to some embodiments, the processing unit 106 determines that a match exists if the local peaks and valleys of the two signals being compared occur at approximately the same frequencies (e.g., within a frequency range of one another). In some embodiments the processing unit 106 may determine that a match exists based on one or more of shape, slopes, and/or variations of the frequency domain curves, the resonance tail deterioration rate (or roll-off rate), the relative magnitude of a resonant response in different frequency bands, differences in polarization responses, and/or the like. However, embodiments of the present invention are not limited to the methods of match identification described above and any other suitable method, as recognized by a person of ordinary skill in the art, may be employed.

As a person of ordinary skill in the art will recognize, prior to comparing signal values, the processing unit 106 (or even the receiver 104) may filter the signal to remove/reduce noise and/or other undesired artifacts, and perform other suitable processes to facilitate proper comparison of signal levels.

In block 208, if the processing unit 106 is able to identify a match, the processing unit 106 determines that a concealed object of interest is present and issues an alert. If no match has been found, then the processing unit 106 determines that no object of interest is present and the process may end or reinitiate at block 202.

While the above process describes the detection of one object of interest embodiments of the invention are not limited thereto. For example, the discrimination algorithm may be modified to detect two or more objects of interest, which have different RF scattering signatures. According to some embodiments, each object of interest is associated with a different pairing of frequency range and transmit-receive polarity combination (e.g., H-H, H-V, V-H, or V-V). Accordingly, the receiver 104 may generate captured signals corresponding to different pairings of frequency range and transmit-receive polarity combination, and the processing unit 106 may analyze each captured signal, as described above, to determine whether it matches any of the stored RF scattering signatures associated with the same pairing of frequency range and transmit-receive polarity combination. Thus, the same CORD system may be able to detect or identify the presence of more than one concealed objects of interest. For example, in some embodiments, the CORD system may be able to concurrently identify the presence of explosive materials, personal firearms, and/or other weapons.

FIGS. 3A-3D are graphs illustrating RF scattering signatures of a simulated wire, a simulated pressure switch, a simulated bomb canister, and a complex system including the combination thereof (which may simulate a typical improvised explosive device) over a frequency range of 0.1 GHz to 2 GHz and for different transmit-receive polarity combinations, and exemplifying the ability of the embodiments of the present invention to detect an object of interest. In each of FIGS. 3A-3D, the X-axis represents the range of frequencies within the bandwidth of the receiver 104 (i.e., 0.1 GHz-2 GHz), according to an embodiment of the present invention; and the Y-axis represents the power level of the received scattered radio wave, corresponding to the V-V, H-H, or V-H/H-V polarity combinations, relative to that of the transmitted radio wave measured in decibels.

Figure 3A:
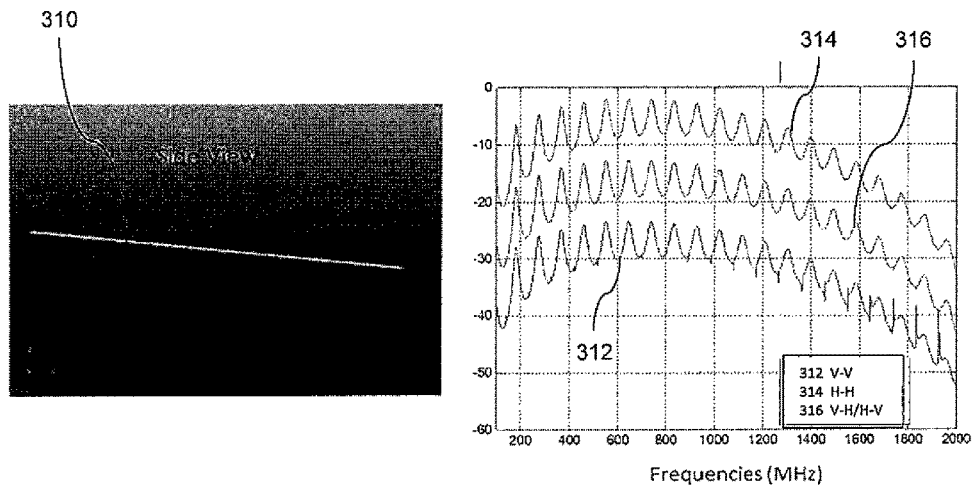
FIGS. 3A-3D are graphs illustrating RF scattering responses of a simulated wire, a simulated switch, a simulated bomb canister, and a complex system including a combination thereof for different transmit-receive polarity combinations, and exemplifying the ability of the embodiments of the present invention to detect an object of interest.
Figure 3B:
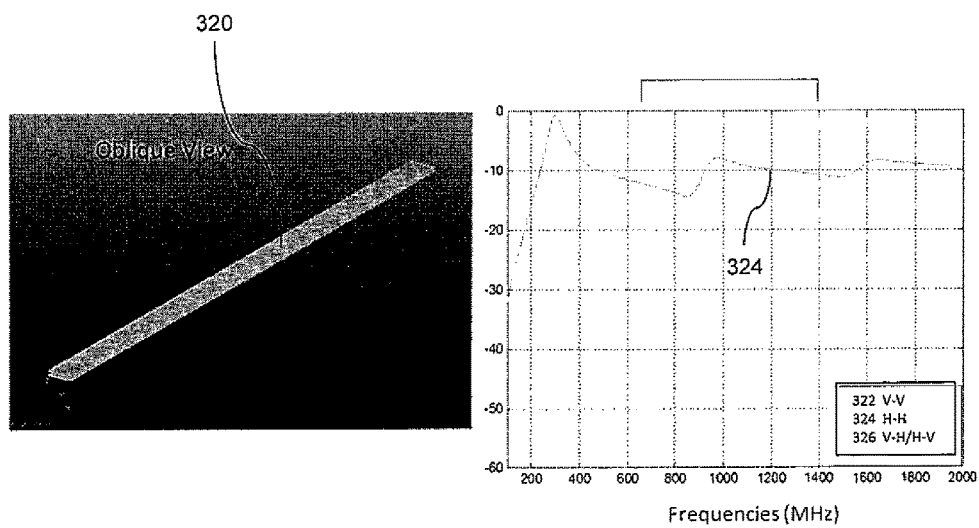
Figure 3C:
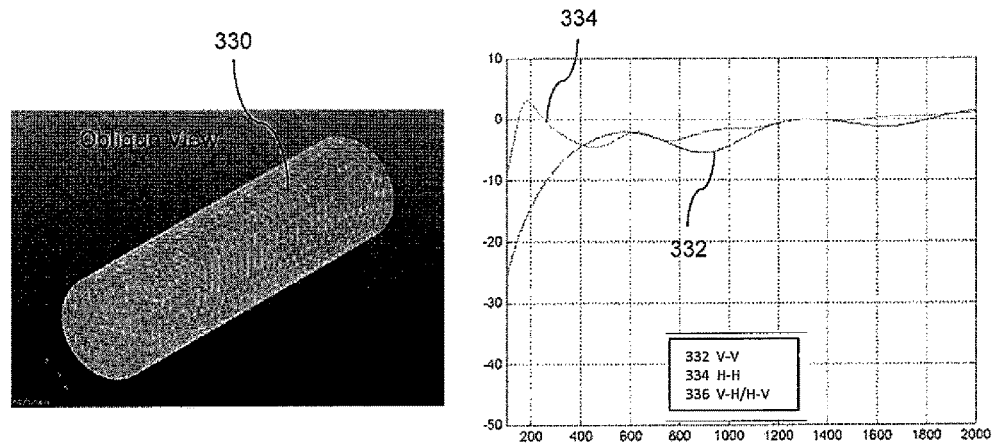
Figure 3D:
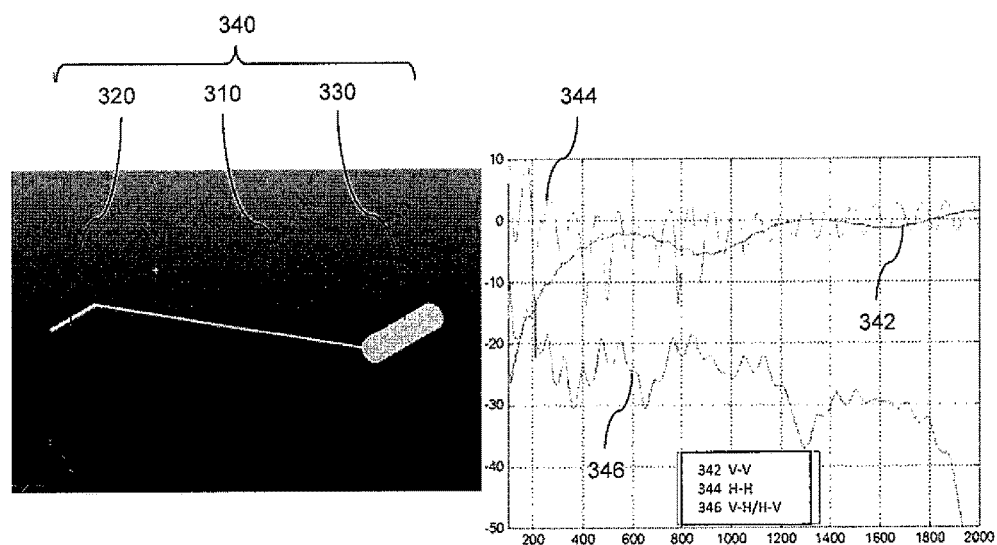

FIG. 3A illustrates the simulated RF scattering signatures 312, 314, and 316 of a pair of parallel wires 310 having a small separation and corresponding to polarity combinations V-V, H-H, and V-H/H-V (which are represented with the same curve 316), respectively. FIG. 3B illustrates the simulated RF scattering signature 324 of a pair of parallel strips of metal 320 having a small separation (which may, e.g., simulate a bomb trigger/switch) and corresponding to the H-H polarity combination. FIG. 3C illustrates the simulated RF scattering signatures 332 and 334 of a cylinder 330 (which may, e.g., simulate a bomb canister) corresponding to the polarity combinations V-V and H-H, respectively. FIG. 3D illustrates the simulated RF scattering signatures 342, 344, and 346 of a more complex system 340 including the wires 310, metals plates 320, and cylinder 330 of FIGS. 3A-3C and corresponding to the polarity combinations V-V, H-H, and V-H/H-V (which are represented with the same curve 346), respectively. As is visually apparent, the RF scattering signature 342 closely resembles the RF scattering signature 332 of the cylinder of FIG. 3C. The comparison shows that if correct frequency range/polarization pairs are chosen, the processing unit 106 can detect the presence of the object of interest even in a very complex scattering environment.

According to some embodiments of the present invention, one or more of the RF scattering signatures 312, 314, 316, 324, 332, and 334 is stored in a data record. After the CORD system 100 emits RF energy toward the complex system 340 and receives scattered RF energy, the receiver 104 may send one or more captured signals corresponding to one or more of the polarity combinations V-V, H-H, and V-H/H-V to the processing unit 106. The one or more captured signals may have a frequency response resembling RF scattering signatures 342, 344, and/or 346, as shown in FIG. 3D. The processing unit 106 may compare each of the captured signals with each of the stored RF scattering signatures. In an example in which the processing unit 106 compares the captured signal corresponding to the V-V polarity combination with the stored RF scattering signatures, the processing unit 106 may identify a match in the signature 332 associated with the cylinder and thus determine that that a cylinder is present in the complex system 340. The comparison of captured signals corresponding to other polarity combinations may not yield a match and, thus, not indicate the identification of any object of interest.

Figure 4:
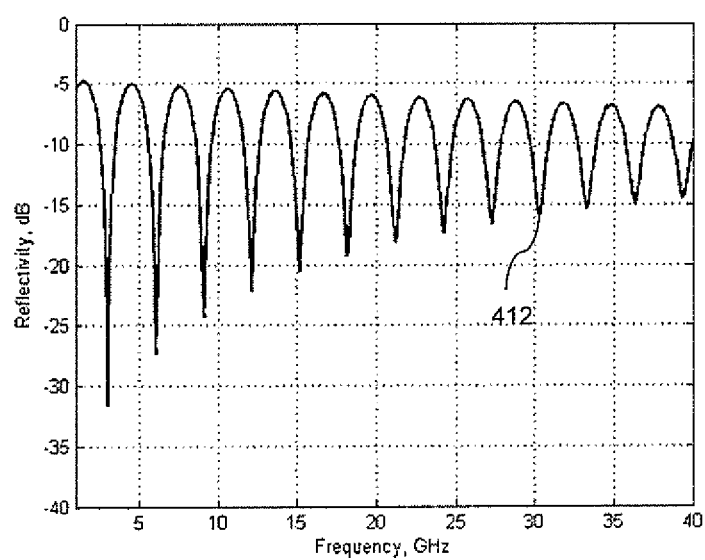
FIG. 4 illustrates a simulated RF scattering response of a dielectric slab corresponding to the vertical-vertical polarity combination.

As a further example of an object's RF scattering fingerprint being affected by its geometry, FIG. 4 illustrates a simulated RF scattering signature 412 of a vest containing a dielectric slab (which may be used to represent a slab of explosive material in a suicide bomber vest) corresponding to the V-V polarity combination. The periodic nature of the frequency response is caused by, for example, the interaction of a first reflection (in time) of emitted RF energy from the front surface of dielectric slab and the second reflection (in time) of emitted RF energy from the back of the dielectric slab. This periodic response may be substantially unaffected by the angle of incidence of the emitted RF energy on the surface of the dielectric slab. The periodic nature of the RF scattering signature of the dielectric slab permits the CORD system 100 to easily distinguish it from the RF scattering response of a human body, which may be approximately uniform over the shown frequency range. Thus, a CORD system, according to embodiments of the present invention, which has the RF scattering signature 412 stored, may be able to detect the presence of the dielectric slab (e.g., slab of explosive material) in a suicide bomber vest worn by a person.

As a person of ordinary skill in the art will recognize, the method and apparatus described herein may be complimented with other commonly known radar techniques (e.g., direction finding algorithms, range gating, etc.) to not only detect the presence of a concealed object of interest, but also to locate its position in an open environment (e.g., locating a suicide bomber in a large crowd of people).

What is claimed is:
1. A method for detecting a concealed object in a target comprising a body and the concealed object, the method comprising:
    emitting, by an emitter, radio frequency (RF) energy having a first linear polarization, toward a direction of the target;
    receiving, by a receiver, a scattered RF energy reflected from the target;

generating, by the receiver, a first signal corresponding to a first component of the received scattered RF energy, the first component having a second linear polarization;

generating, by the receiver, a second signal corresponding to a second component of the received scattered RF energy, the second component having a third linear polarization, orthogonal to the second linear polarization;

comparing, by a processor, each of the first signal and the second signal with a plurality of stored RF scattering signatures, each of the RF scattering signatures being associated with an object of interest; and detecting, by the processor, the concealed object when at least one of the first signal and the second signal matches one of a plurality of stored RF scattering signatures based on a pairing of:
   a frequency response; and
   a transmit-receive polarization combination.

2. The method of claim 1, further comprising:
retrieving the plurality of stored RF scattering signatures from a stored data record.

3. The method of claim 1, further comprising:
identifying the concealed object based on the matching one of the plurality of RF scattering signatures.

4. The method of claim 1, wherein the emitting RF energy further comprises emitting RF energy of one or more of a horizontal polarization and a vertical polarization, and wherein the received scattered RF energy reflected from the target has a horizontal polarization or a vertical polarization.

5. The method of claim 1, wherein each of the plurality of stored RF scattering signatures is further associated with a frequency band.

6. The method of claim 5, wherein the frequency band is a frequency range in which a RF scattering response of an associated object of interest is distinguishable from RF scattering responses of other objects of non-interest comprising clutter and the body.

7. The method of claim 1, wherein one or more of the stored RF scattering signatures represent one or more simulation results, or data collected from one or more real-world experiments.

8. The method of claim 1, wherein the body is a biological life form and the concealed object is a concealed weapon.

9. The method of claim 1, wherein at least one of the first signal and the second signal matches one of the plurality of stored RF scattering signatures when a standard deviation of a difference between at least one of the first signal and the second signal and the one of the plurality of stored RF scattering signatures is below a threshold.

10. The method of claim 1, wherein at least one of the first signal and the second signal matches one of the plurality of stored RF scattering signatures when a mean of a difference between at least one of the first signal and the second signal and the one of the plurality of stored RF scattering signatures is below a threshold.

11. A radar detector configured to detect a concealed object in a target comprising a body and the concealed object, the radar detector comprising:
   an emitter configured to emit RF energy toward a direction of the target;
   a receiver configured to receive a scattered RF energy reflected from the target, and to generate:
      a first signal corresponding to a first component of the scattered RF energy reflected from the target, the first component having a second linear polarization; and
      a second signal corresponding to a second component of the scattered RF energy reflected from the target, the second component having a third linear polarization, orthogonal to the second linear polarization; and
   a processor configured:
      to retrieve a plurality of stored RF scattering signatures from a stored data record;
      to compare each of the first signal and the second signal with the plurality of stored RF scattering signatures, each of the stored RF scattering signatures being associated with an object of interest; and
      to detect the concealed object when at least one of the first signal and the second signal matches one of a plurality of stored RF scattering signatures based on a pairing of:
         a frequency response; and
         a transmit-receive polarization combination.

12. The radar detector of claim 11, wherein the emitter emits RF energy of one or more of a horizontal polarization and vertical polarization.

13. The radar detector of claim 11, wherein the received scattered RF energy reflected from the target has a horizontal polarization or a vertical polarization.

14. The radar detector of claim 11, wherein each of the plurality of stored RF scattering signatures is further associated with a frequency band.

15. The radar detector of claim 14, wherein the frequency band is a frequency range in which a RF scattering response of an associated object of interest is distinguishable from RF scattering responses of other objects of non-interest comprising clutter and the body.

16. The radar detector of claim 11, wherein the body is a biological life form and the concealed object is a concealed weapon.

17. The radar detector of claim 11, wherein at least one of the first signal and the second signal matches one of the plurality of stored RF scattering signatures when a standard deviation of a difference between at least one of the first signal and the second signal and the one of the plurality of stored RF scattering signatures is below a threshold.

\* \* \* \* \*